United States Patent
Lutz et al.

(10) Patent No.: US 10,530,888 B2
(45) Date of Patent: Jan. 7, 2020

(54) CACHED DATA EXPIRATION AND REFRESH

(71) Applicant: Home Box Office, Inc., New York, NY (US)

(72) Inventors: Jonathan David Lutz, Seattle, WA (US); Sata Busayarat, Seattle, WA (US); Mei Qi, Bellevue, WA (US)

(73) Assignee: HOME BOX OFFICE, INC., New York, NY (US)

(*) Notice: Subject to any disclaimer, the term of this patent is extended or adjusted under 35 U.S.C. 154(b) by 127 days.

(21) Appl. No.: 15/170,668

(22) Filed: Jun. 1, 2016

(65) Prior Publication Data

US 2017/0353577 A1 Dec. 7, 2017

(51) Int. Cl.
| | |
|---|---|
| *H04L 29/08* | (2006.01) |
| *H04L 12/26* | (2006.01) |
| *G06F 17/30* | (2006.01) |
| *G06F 12/123* | (2016.01) |
| *G06F 16/957* | (2019.01) |
| *H04L 29/06* | (2006.01) |

(52) U.S. Cl.
CPC ........ *H04L 67/2852* (2013.01); *G06F 12/123* (2013.01); *G06F 16/9574* (2019.01); *H04L 43/16* (2013.01); *H04L 67/2842* (2013.01); *H04L 67/2847* (2013.01); *H04L 69/28* (2013.01); *G06F 2212/464* (2013.01)

(58) Field of Classification Search
CPC ..... H04L 67/2852; H04L 69/28; H04L 43/16; H04L 67/2842; H04L 67/2847; G06F 17/30902

See application file for complete search history.

(56) References Cited

U.S. PATENT DOCUMENTS

| | | | |
|---|---|---|---|
| 6,618,751 B1 | 9/2003 | Challenger et al. | |
| 6,760,813 B1 * | 7/2004 | Wu | G06F 12/121 707/999.003 |
| 6,785,769 B1 * | 8/2004 | Jacobs | G06F 17/30902 707/E17.12 |

(Continued)

OTHER PUBLICATIONS web2py, "Class Cache;" Sep. 26, 2011, http://gelfand.crbs.ucsd.edu/examples/static/epydoc/web2py.gluon.cache.Cache-class.html.*

(Continued)

*Primary Examiner* — Scott B Christensen

(74) *Attorney, Agent, or Firm* — Amin, Turocy & Watson, LLP

(57) ABSTRACT

The described technology is directed towards maintaining a cache of data items, with cached data items having current value subsets and next value subsets. The cache is accessed for data item requests, to return a cache miss if a requested data item is not cached, to return data from the current value subset if not expired, to return data from the next value subset if the current value subset is expired and the next value subset is not expired, or to return a cache miss (or expired data) if both subsets are expired. Cached data items are refreshed, (e.g., periodically), when a data item's current value subset is expired by replacing the data item's current value subset with the next value subset and caching a new next value subset, or caching a new next value subset when the next value subset will expire within a threshold time.

18 Claims, 10 Drawing Sheets

(56) References Cited

U.S. PATENT DOCUMENTS

| | | | |
|---|---|---|---|
| 6,854,018 B1* | 2/2005 | Li | H04L 67/2847 709/203 |
| 7,349,902 B1* | 3/2008 | Arlitt | G06F 17/30902 |
| 7,461,262 B1* | 12/2008 | O'Toole, Jr. | G06F 21/6218 380/255 |
| 8,769,047 B1* | 7/2014 | Coppola | H04L 67/2842 709/218 |
| 2002/0120710 A1* | 8/2002 | Chintalapati | G06F 17/30902 709/216 |
| 2003/0126232 A1* | 7/2003 | Mogul | G06F 17/30902 709/219 |
| 2005/0108191 A1* | 5/2005 | Iyengar | G06F 17/30902 |
| 2007/0067301 A1* | 3/2007 | Malik | G06F 21/10 |
| 2007/0079342 A1* | 4/2007 | Ellis | H04N 5/913 725/89 |
| 2007/0294480 A1* | 12/2007 | Moser | G06F 12/123 711/133 |
| 2008/0281798 A1 | 11/2008 | Chatterjee et al. | |
| 2009/0132640 A1* | 5/2009 | Verma | G06F 17/30864 709/203 |
| 2010/0192175 A1* | 7/2010 | Bachet | G06Q 10/0637 725/31 |
| 2010/0332586 A1* | 12/2010 | Jogand-Coulomb | H04L 67/2847 709/203 |
| 2012/0215779 A1* | 8/2012 | Lipstone | G06F 17/30035 707/737 |
| 2014/0067913 A1 | 3/2014 | Von Haden et al. | |
| 2014/0173219 A1* | 6/2014 | Torngren | G06F 3/048 711/141 |
| 2014/0181186 A1* | 6/2014 | Stevens | H04L 67/322 709/203 |
| 2016/0026568 A1 | 1/2016 | Marshall et al. | |
| 2016/0065576 A1* | 3/2016 | Zhang | H04L 63/10 726/3 |
| 2017/0187822 A1* | 6/2017 | Thomee | H04L 67/2847 |
| 2017/0244988 A1* | 8/2017 | Hasek | H04N 21/23106 |

OTHER PUBLICATIONS

International Search Report and Written Opinion dated Aug. 23, 2017 for International Application Serial No. PCT/US2017/034751, 18 pages.
European Office Action for European Application Serial No. 17729629.0-1221 dated Oct. 4, 2019, 11 pages.

* cited by examiner

CACHED DATA EXPIRATION AND REFRESH

BACKGROUND

Content providers, such as those that stream video content to client subscribers, provide their clients with selection data on an interactive user interface. The selection data is obtained from a data service, and typically includes user interface elements such as menus and icons/tiles representing the available content, e.g., movies and television shows, with which client users can interact to select content for playing.

In a relatively large data service, in order to keep up with a large number of client requests, the data is cached when data is retrieved by the data service. This allows subsequent client requests for an already retrieved data item to be satisfied from a cache rather than from underlying (e.g., physical) data store level of databases and/or other backing data sources of the data service.

However, conventional caching is problematic when program content and its associated selection data needs to be protected from early viewing. If a future show that has not yet been officially released to the public accidentally becomes available, even temporarily, some users can view the show, possibly copy and disseminate it and so on, while other users will be frustrated because they will hear of the release but not be able to view the content until the appropriate time. Similarly, even if the viewable content itself is not available, a user who sees a selection icon/tile for a show that is blocked will be frustrated upon interacting in an attempt to view it.

Thus, at the moment a show becomes available for viewing, the set of available content changes, whereby a spike in the number of client requests occurs; these requests need to be handled below the data caching level. When there is a spike in the number of requests, the data service may fail to keep up. To avoid failing, a typical solution is to add capacity at a level below the caching level, e.g., add larger and/or more data stores/databases operating in parallel. However, adding such additional capacity is expensive.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, aspects of the technology described herein are generally directed towards maintaining multiple subsets of values for cached data items, including a future value subset that is used once a current value subset expires. Aspects include a cache configured to maintain data items in cache locations, in which an identifier of a data item corresponds to a cache location key, and the cache data at that location comprises a value set. Cache access logic handles the value set in the cache location as multiple data value subsets. Cache refresher logic determines whether a subset of data in a cache location is expired, and when expired, replaces the subset of data that is expired with a replacement subset, and obtains a new replacement subset for caching in the cache location.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards caching current data and future data (e.g., for any data item or any collection of data items, for example), in a way that allows the future data to become the current data and get used after the (formerly) current data expires. Caching is arranged such that the future data is not accessible to clients before a data service-specified expiration time. Thus, any client requests for data before the specified expiration time of that data get the current data, while any client requests after the specified expiration time gets the future data (which has become the now-current data).

In one or more aspects, the current data may be specified to expire in the cache just before an anticipated spike in data requests will occur. At this moment, future data that was written into the cache in advance (e.g., by a system cache refresher component) becomes the now-current data, and is used to satisfy client requests. As will be understood, such caching of current and future data prevents an early release of data until the desired moment, while also preventing cache misses that would otherwise result in a spike in requests to the underlying data stores of the data service.

It should be understood that any of the examples herein are non-limiting. For instance, some of the examples refer to returning program-related catalog items, such as built from various data sources to represent television content such as movies or shows. However, the technology described herein is independent of any particular type of data being retrieved. Further, the technology described herein is exemplified with respect to a front-end/client facing service and a back-end data service that returns data to the front-end data retrieval service when needed; however, this is only one implementation, and a single data service that operates to respond to client requests without separate front-end and back-end services may benefit from the technology described herein. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and data retrieval in general.

Figure 1:
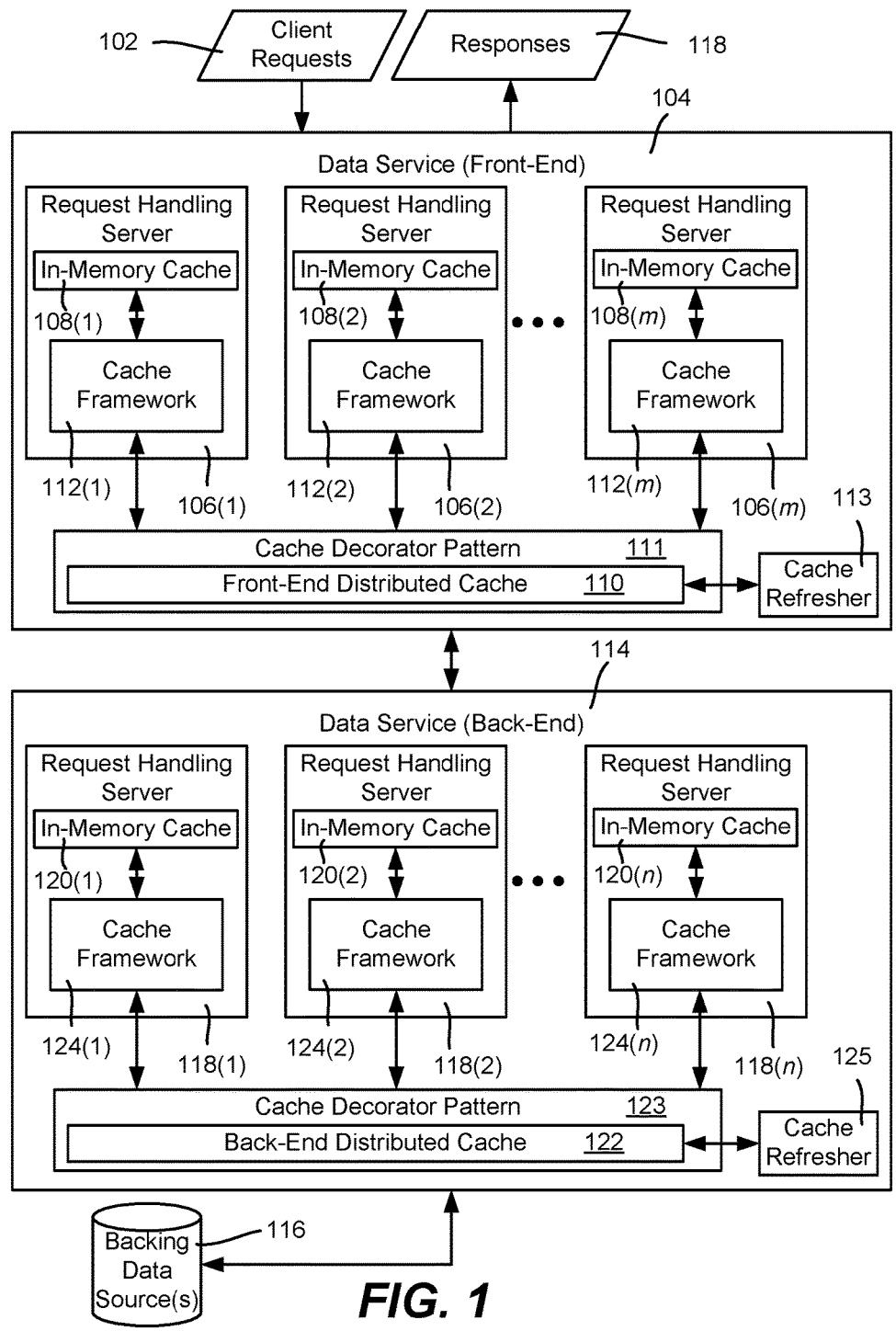
FIG. 1 is an example block diagram representation of components that handle requests for data, as well as refresh caches with future data, according to one or more example implementations.

FIG. 1 is a block diagram representing example components that may be used to provide and work to provide responses to data requests as described herein. In FIG. 1, client requests 102 are received at a (e.g., front-end) data service 104. One such front-end data service 104 comprises a cluster of generally load-balanced server machines 106(1)-106(m), where m represents any practical number of server (virtual and/or physical) machines. In one or more implementations, each of the load-balanced server machines 106(1)-106(m) has an in-memory cache, 108(1)-108(m), respectively.

Also shown in FIG. 1 is a distributed cache 110, e.g., a REDIS cache shared among the request handling servers 106(1)-106(m). In a typical implementation, the distributed cache 108 is larger than the individual in-memory caches 108(1)-108(m) and has a higher hit rate; however the distributed cache 110 takes longer to access, e.g., needing a network request and response. In general, in one or more implementations, each request handling server, e.g., the server 106(1), has a respective cache framework 112(1) that attempts to retrieve data from the server's in-memory cache 108(1) when available, and then from the distributed cache 108 if not. If still not available, the front-end data request handling server 106(1) contacts the back-end data service 114 to obtain the requested data.

As described herein, a cache may be configured to maintain current and future data for any cache entry. Cache access logic needs to know how to select one set of data over another when returning data from the cache because other entities, such as a client requestor, is only expecting one data item in response to its request. Similarly, cache writing operations need to handle current and future data when only one data item is to be written to a cache location. In one or more implementations, such cache access logic is contained in a cache decorator pattern that wraps a corresponding cache and is configured to work with current and future data for any cache entry.

Further, each such wrapped cache has a cache refresher (logic) that manages (e.g., refreshes) the current and future data as described herein. While any cache may be used in this way, (including a server in-memory cache), for purposes of explanation the front-end distributed cache 110 is shown as being wrapped with a cache decorator pattern 111, with its data managed (in part) via a cache refresher 113.

Also shown in FIG. 1 as part of the data service is a back-end data service 114 that is coupled to one or more backing data sources 116. In one or more implementations, the back-end data service 114 comprises a cluster of generally load-balanced server machines 118(1)-118(n), where n represents any practical number of such server (virtual and/or physical) machines. In one or more implementations, each of the load-balanced data server machines 118(1)-118(n) has an in-memory cache 120(1)-120(n), respectively. A back-end service level distributed cache 122 likewise is typically provided. Cache frameworks 124(1)-124(n), which are generally similar (and can be identical modules in one or more implementations) to that of the cache frameworks 112(1)-112(m) of the front end servers 106(1)-106(m), are used in one or more implementations; note however that a cache "miss" at the back-end level caches 120(1)-120(n) and the distributed cache 122 result in the backing data source(s) 116 being accessed for the data, (since there is no other "back-end" data service to this back-end part of the data service. Such backing data sources 116 may be configured with an interface/wrapper or the like so as to be considered another cache (a "virtual cache") to the cache frameworks 124(1)-124(n). If wrapped in this way, the cache frameworks 124(1)-124(n) of the back end servers 118(1)-118(n) automatically use this "virtual cache" for its cache misses.

As with the front-end, the caches of the back-end data service may be wrapped with a cache decorator pattern. For purposes of explanation the back-end distributed cache 122 is similarly shown as being wrapped with a back-end cache decorator pattern 123, with its data managed in part via a cache refresher 125, as described herein.

With respect to expiration times of cached data, the initial cache expiration time for a data item may be based upon the item data expiring within a predetermined expiration time window (as maintained at one of the data stores), or within a maximum default expiration time. For example, (using one-minute granularity), if a movie offering time window for a movie "Movie123" expires at 11:59 on Jun. 2, 2016, then the expiration time can be no later than that. However, so that cached data is not too stale (e.g., changes sometimes occur to mostly static data), rather than always use each item's time window expiration for its cached data entry, (which may be on the order of months, or even years, if there even is one), a default time window (e.g., of six hours) from the time of the request is used as a maximum expiration time. Thus, for example, (using six hours as the default maximum), if a request for a data item "Movie123" (that results in the data item being cached) is received at 7:00 pm on Jun. 1, 2016, the expiration time is 11:59 on Jun. 2, 2016, which is the offering time window expiration; if instead the request was received at 7:00 pm on May 10, 2016, then the expiration time is initially set to six hours later, which is 1:00 am on May 11, 2016.

The same time window expiration concept may apply to a single data item as well as any other data item-related entity, such as a collection of data items. For example, if a television show that is part of a collection is to premiere its latest episode at 9:00 pm on May 15, then the previous data item collection's time window expires at 8:59:59 pm on May 15 (using a one-second granularity in this example), because at 9:00:00 pm the collection changes to now include the new episode. Thus, the expiration of the cached collection is no later than 8:59:59 pm on May 15. As can be readily appreciated, if the show is very popular, a great number of client requests for the new collection will be made at 9:00:00 pm on May 15.

As will be understood, the technology described herein plans for the expiration of data and the corresponding spike in client requests. To this end, the technology is based upon placing dual (or more) values for each cached data item, e.g., a [key, value set] pair. The value set comprises a current value subset (or simply current value, comprising a data blob or instantiated object) and current expiration time for the data item current value, and a future value subset (also referred to herein as a "next" value subset or simply a next value, similarly comprising a data blob or instantiated object) along with a next expiration time for that same data item. The value set thus comprises two data subsets, one current and one future, along with an expiration date and time for each one, e.g., the cache entry may be represented by [key, value set (current value, future value)]. As will be understood, a cache refresher component, described herein, analyzes the (key, value set) pairs in the cache and based upon the expiration times, refreshes the current and future values as needed.

Figure 2:
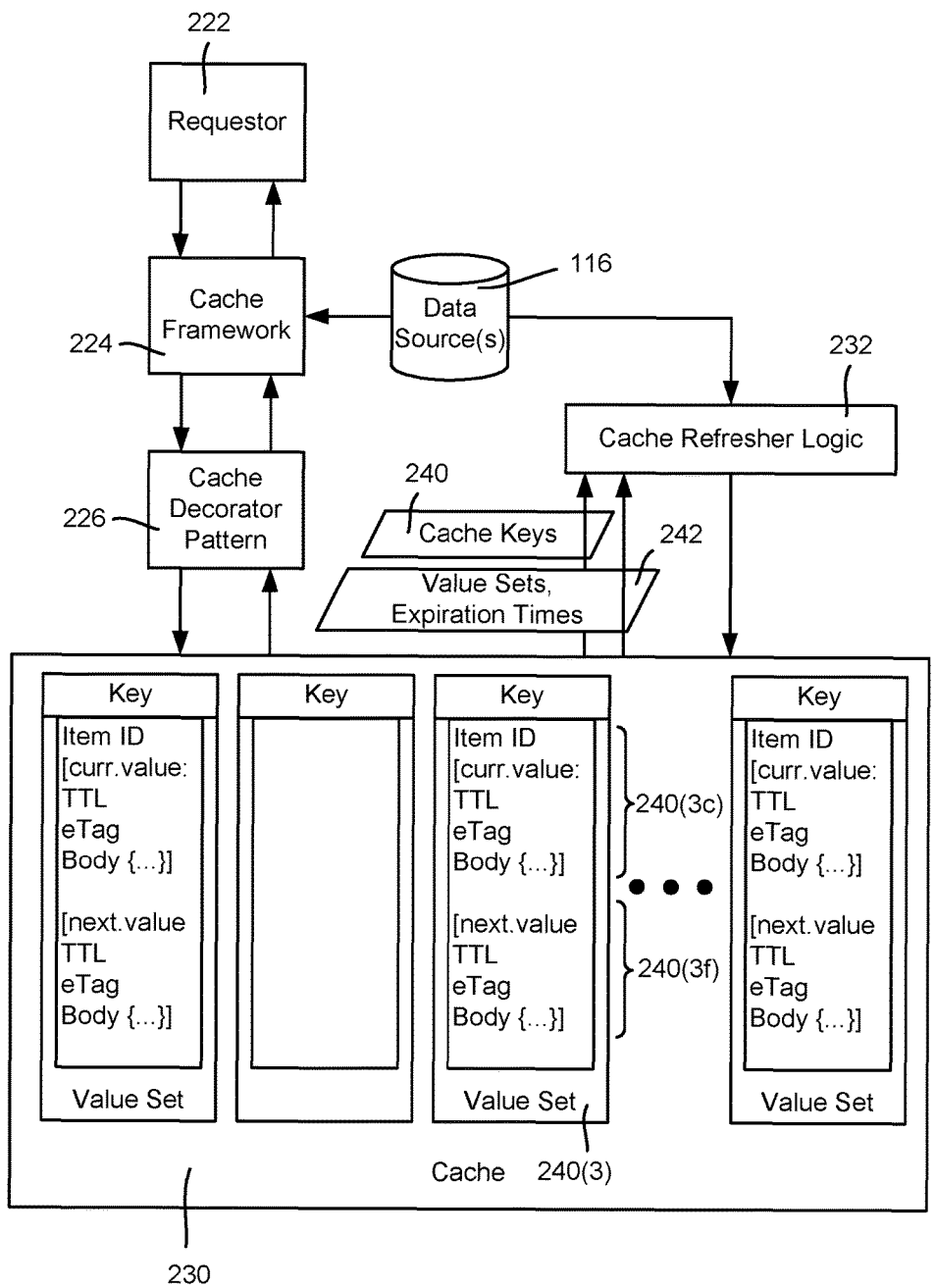
FIG. 2 is an example block diagram representation of a cache having current and future data, along with components that use the exemplified cache, according to one or more example implementations.

FIG. 2 is a block diagram showing a requestor 222 making a request for a data item that reaches the cache framework 224. It is understood that the requestor 222 may be a front-end data service server (e.g., 106(1)) that is making a request to the back-end data service 114. Alternatively, the requestor may be a client user and device making a request to the front-end data service 104. In any event, the request reaches the recipient's cache framework 224.

In general, the cache framework 224 seeks data from the caches in a tiered read-through order when multiple caches are present, e.g., first from the in-memory cache of the server that hosts the cache framework 224, then from the distributed cache 122 and then the data sources 116 (if the cache framework is in the back-end). The cache frameworks 112(1)-112(m) return a cache miss to their respective server if the data is not cached, whereby the front-end data service portion communicates the request to the back-end data service portion. The cache framework 224 also handles write-through operations.

For purposes of brevity, FIG. 2 is further described herein with respect to a back-end data service, in which the depicted cache 230 corresponds to the distributed cache 122 of FIG. 1. Notwithstanding, it is understood that the technology described herein may be applied to any cache, as well as to any front-end or back-end data service, or to a data service in general.

In general, the cache framework 224 attempts to obtain the data of a cached data item based upon a key that is derived from (e.g., via a hash computation) of the data item identifier (ID), which is unique (at least) within the data service. The data (the value portion of the [key, value set] pair) may be cached, cached but expired, or not found in the cache. Note that for some types of caches, cache access requests may be batched for efficiency.

In one or more implementations, the cache framework 224 is unaware of current data and/or future data concepts, and simply sends a "Get" request for a data item that includes the data item ID; (batch requests containing multiple IDs also may be sent, but in general are not separately described herein for purposes of brevity). Thus, the cache framework 224 requests a data item by its ID, and if the item exists in the cache 230, expects a value including the instantiated object data (or unparsed data blob to be parsed into the instantiated object data) and an expiration time in return. The value, if returned, is the current value or the future value, but not both, as the cache framework 224 only expects one such value or a cache miss for this key.

To deal with cache entries that contain current data and future data as described herein, a cache decorator pattern 226 adds functionality that deals with current data and future data for any cache configured therewith, including the cache 230. In general, when the cache framework 224 provides a key in an attempt to retrieve data, and the data is in the cache 230, the cache decorator pattern 226 determines based upon the request time and the expiration times whether to return current data, or return "future" data (because the current data has expired), or return a cache miss (because both are expired; although described herein is the possibility of intentionally returning expired data). Note that the cache decorator pattern allows the current and future data concepts to be applied on a per-cache basis, e.g., a distributed cache may implement the cache decorator pattern, but not an in-memory cache; however it is alternatively feasible to include such functionality in the cache framework, (or in another cache-accessing component if a cache framework is not in use in a given implementation).

As exemplified in FIG. 2, a cache entry's value set (e.g., 240(3)) thus may include a current value (curr.value data blob or instantiated object data) 240(3c) and a future value (next.value data blob or instantiated object data) 240(3f). As described herein, the cache decorator pattern 226 knows which value to return based upon the current value expiration time (relative to the request time or the actual time of access).

In general, the cache decorator pattern 226 also sets both the current value and the future value when the cache is written, e.g., via a set request from the cache framework. Initially, there is only one set of data returned from the data source(s), including a single expiration time, and thus the cache decorator pattern 226 initially sets both value subsets including the data portions and the expiration times to be the same.

In order to refresh the cache with future data as appropriate, cache refresher logic 232 periodically (or on some other triggered basis) processes the cache entries, including deleting certain cache entries, and inserting future data into certain other entries, as described herein. The triggering time of the cache refresher logic is configurable, e.g., to run periodically every minute. In one or more implementations, the cache refresher logic 232 operates as a separate process, e.g., separate from the server process(es) that handles user requests.

In one or more implementations, the cache refresher logic 232 obtains the set of keys 240 (scans) for cache locations that have data, obtains the expiration times and value sets 242 (for each key), and then processes each value set looking for expired current data as well as future data that is to expire within a threshold time limit. Further, the cache refresher logic 232 deletes entries that are expired and for which no future data is present or available. More particularly, certain data items such as representing movies and television shows are only offered within a certain time window, e.g., from May 1, 12:00 am EDT to Jul. 1, 12:01 am EDT. Such data items that are outside the offering window are deleted by the cache refresher logic 232 after the current data has expired and no future data is present, (because there is no future data available for a data item once outside the time window). Note that if there is no future data, the cache item is preserved until the current value is expired; only upon current value expiration is the cache item deleted when there is no future data.

The cache refresher logic 232 refreshes certain cached entries based upon the current value's and next value's (future data) expiration times. In general, if the current value is expired, the cache refresher logic 232 changes the next value to become the current value, and requests a new next future value from the data sources 116. Further, the cache refresher logic 232 requests a new next future value from the data sources 116 if the next value will expire within a (data service configurable) threshold time. The time of the new next future value may be based upon the expiration time of what is now the current value, e.g., to request a new next future value as if the time was the expiration time of (what is now) the current value. Thus, for example, if the now-current expiration time is 5:00 pm, then the cache refresher logic 232 requests future data as if the request time was 5:00 pm, instead of the actual time of (e.g., 4:55 pm). In this way, if for example a collection is to be changed at 5:00 pm, the current value is refreshed with what was formerly the future value (the previous collection data) with an expiration time of 5:00 pm, while new future data is obtained (the new collection data with an 11:00 pm expiration, for example) which the cache decorator switches to for any request at or after 5:00 pm.

Figure 3:
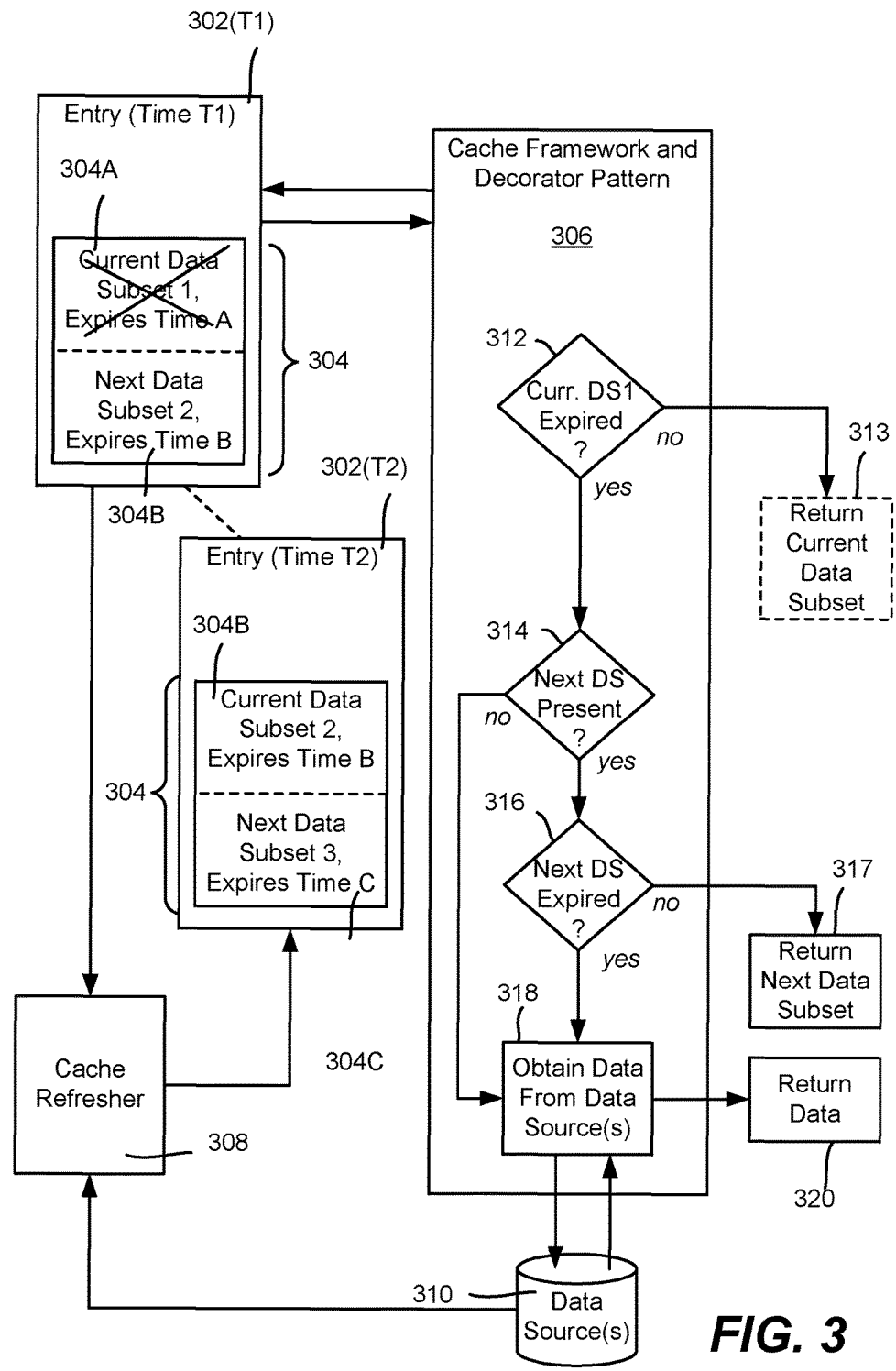
FIG. 3 is an example block/logic diagram showing the use and caching of current and future data, according to one or more example implementations.

FIG. 3 shows an example of cached data with two subsets of data per cached item 304, each with its own expiration time. This is represented in FIG. 3 by a cache entry 302(T1) at time T1, having a cached data item value set 304, which at time T1 comprises one value subset 304A with a current expiration time A, and another value subset 304B with a future expiration time B. At time T2, after a run of the cache refresher 308, the same cache entry is labeled 302(T2), in which the value set 304 at time T2 has cached data item 304(2) comprising one value subset 304B with a current expiration time B, and another value subset 304B with a future expiration time C.

Thus, consider that the cache framework in conjunction with the cache decorator pattern (collectively labeled 306 in FIG. 3) accesses the data item 304 for a request. The cache decorator pattern determines (decision block 312) whether the current data subset (DS) 304A is expired; if not expired, this data subset 304A is returned at block 313 and the retrieval is done. If expired, instead of having to further request the data from some other source, the cache framework 306 checks the second, next data subset 304B and determines that such data exists and is not expired (decision blocks 314 and 316). Thus, the other (next) data subset 304B, which is no longer future data, is returned (block 317). Only if the next data subset 304B is not found or found and expired does the cache framework (or other entity at block 318) attempt to obtain the data from the data sources 310 for returning at block 320.

When the cache refresher 308 is later run, the (formerly next) data set 304B becomes the current data set, and a new future data set 304C is obtained from the data source(s) 310 with future data and a future expiration time C. In this way, the cache refresher 308 pre-populates cache entries with future data so that when the regular cached data expires, the cache already contains the next set of data. This now current subset of data 304B is returned by the cache framework and decorator pattern 306 until it also expires; at some time (e.g., before this now-current subset expires), a new future subset is populated with future data by the cache refresher 308. This process continues until no such future data can be obtained, e.g., because the data item is outside of the offering time window, whereby once the now-current subset expires, the cache refresher 308 deletes the cache entry on its subsequent run.

Figure 4:
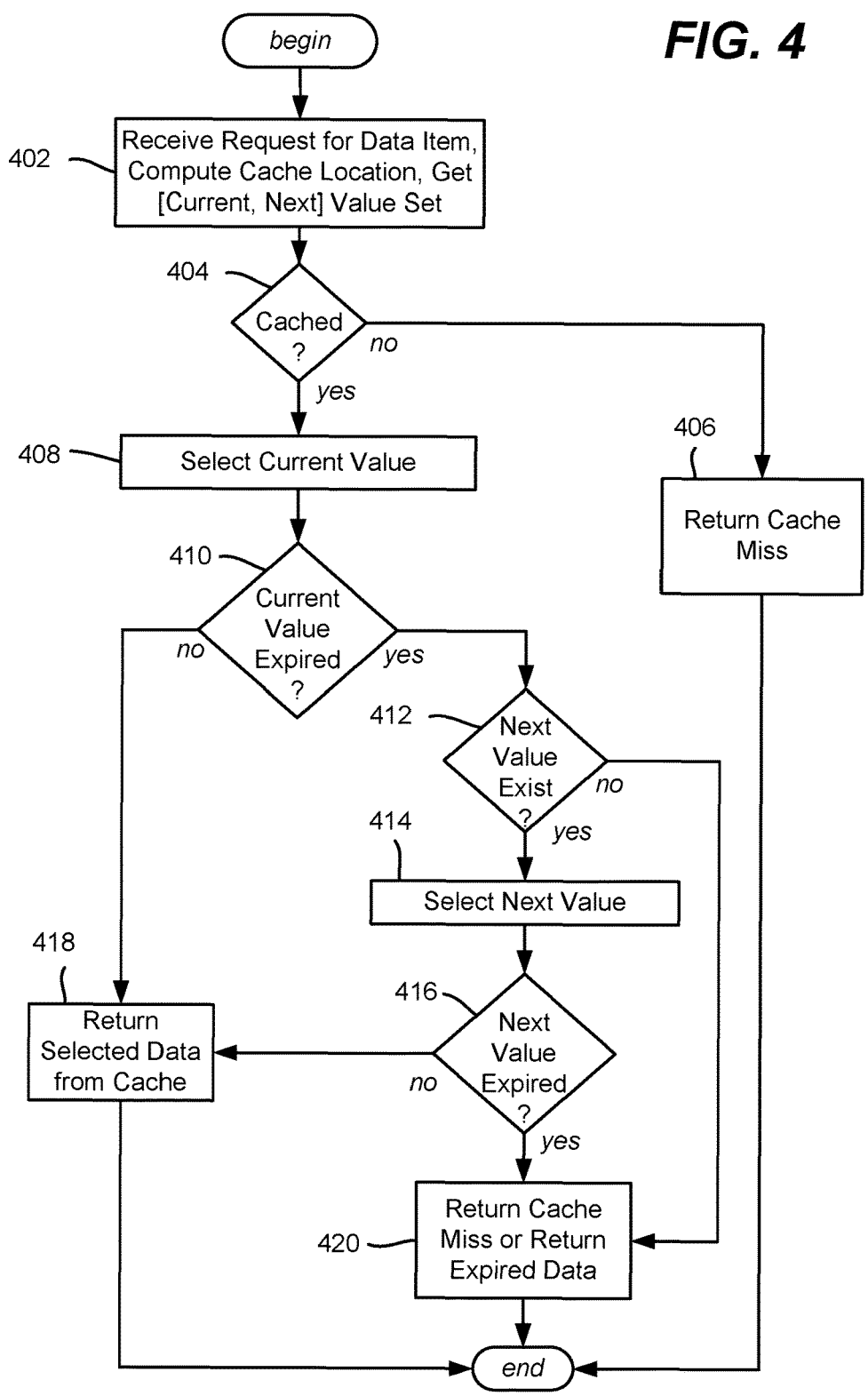
FIG. 4 is a flow diagram showing example logic/steps that may be taken to return current or future data from a cache based upon expiration times, as well as other possible return information, according to one or more example implementations.

FIG. 4 is a flow diagram showing example steps that may be taken by the cache framework and cache decorator pattern, to return cached data or a cache miss. Step 402 represents the cache framework receiving a request for data, which may be a get request or a batch request; (for purposes of explanation, a get request is described herein). Via the cache decorator pattern, both the current and next value subsets are obtained as a single value set.

Step 404 (e.g., via the cache decorator pattern) evaluates whether the cache has an entry for the request, that is, at the key/cache location corresponding to the requested data item ID. If not, step 404 branches to step 406 which returns a cache miss with respect to this cache; for such a cache miss where there is no cached data, the cache framework may go on to a next cache (which may be the data store for the back end) or return a cache miss, e.g., to the front-end component that invoked the cache framework.

If data is cached at this cache location, step 408 (e.g., performed by the cache decorator pattern) selects the current value subset of the key, value set pair. Step 410 evaluates whether the current expiration time has been reached. If not, step 418 (e.g., performed by the cache decorator pattern) returns the selected (current) value to the cache framework, and from there to the requestor.

If instead the current value subset was expired at step 410, step 412 evaluates whether the next value subset portion exists; (note that as set forth above, it is possible that such a subset does not exist, which may be because the item is now outside of the offering window). Such a state in which the current value is expired and the next value does not exist may be considered as an error at this point, however an alternative, shown in FIG. 4, is to branch to and perform step 420, described below.

If the next (future) value subset exists at step 412, step 414 selects this next value subset. Step 416 evaluates whether this next value subset is also expired. If not, this now-selected (at step 414) data value subset is returned to the requestor via the cache decorator pattern/cache framework.

If both the current and next value subsets are expired, step 420 is performed; (in this example, step 420 is also performed if the current value subset is expired and no next value subset exists). In one or more implementations, step 420 operates differently depending on whether the cache is the front-end cache or the back-end cache. For a back-end cache, a cache miss is returned, whereby the cache framework goes to the next cache in the tier, which may be the "virtual cache" data store or stores.

For a front-end cache, the expired data may be returned, along with some indication (which may be the timestamp itself) that the data is expired. If the expiration is for data cached at the last cache in the front-end cache tier at the front-end level, the front-end may then request the data from the back-end, and obtain fresh data that way. However if, for example, the back-end is unable to return the data, e.g., because a data source is down or is taking too long to respond, the front-end can choose to use the expired data (rather than return an error). Note that the type of error may be considered by the front-end, e.g., if the back-end returns an error that indicates that the data item is outside its offering time window, then the front-end may choose to indicate this to the client user rather than use the expired data.

Figure 5:
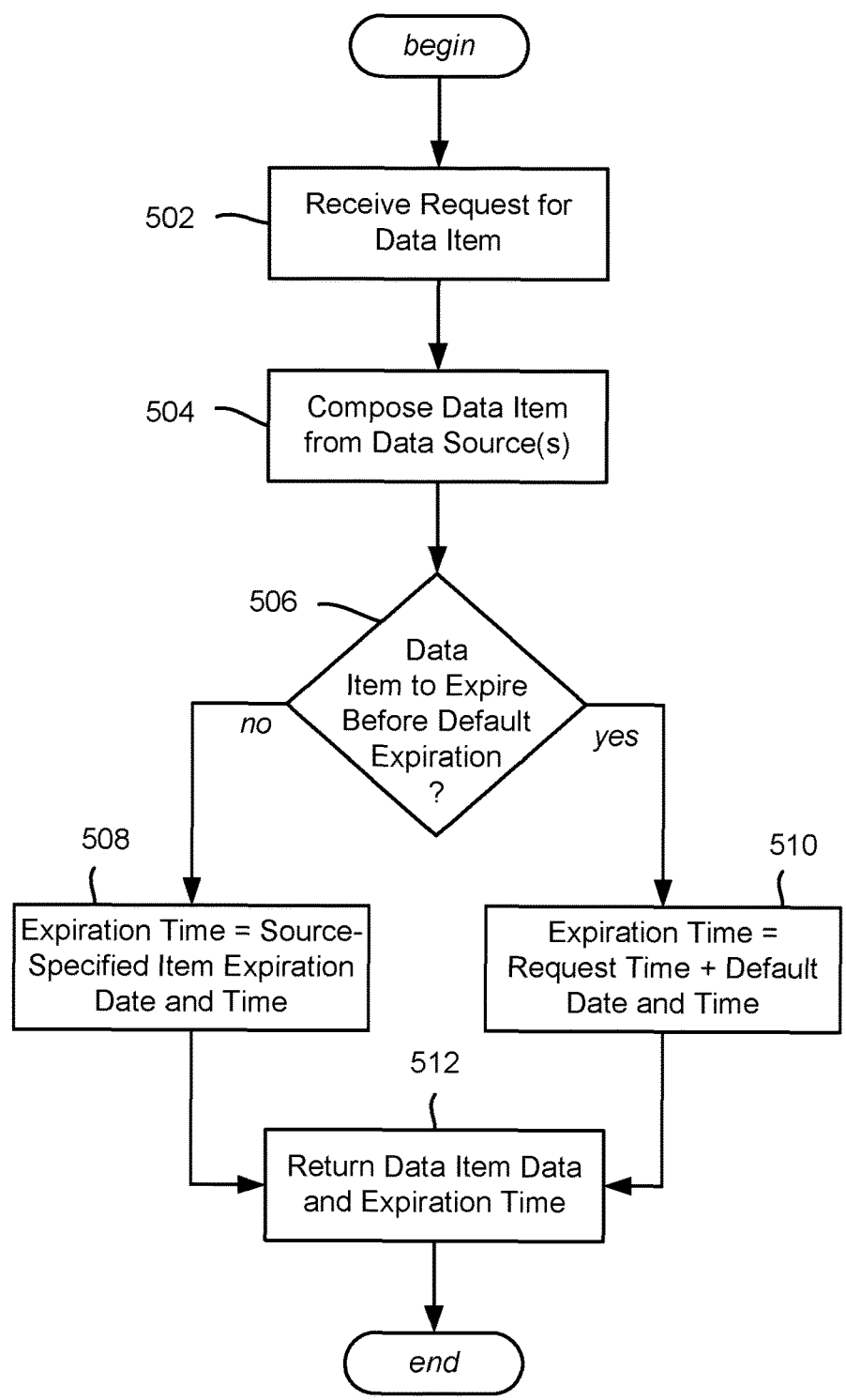
FIG. 5 is a flow diagram showing example logic/steps that may be taken to cache data, including determining an expiration time for the cached data, according to one or more example implementations.

FIG. 5 shows example steps that may be taken when a request for a data item from a front-end server is received at a back-end server, and the request cannot be satisfied from a back-end cache. Thus, the data item needs to be obtained from the data source or sources. This may be because the data item has not been previously requested and is thus not cached, because the data item has expired in each back-end cache; (including any next/future data value subset), or because the item has been evicted from the cache for any other reason.

Note that a requested data item may need to be composed from multiple sub-parts, e.g., a television show may have a title sub-part, rating sub-part, representative image (URL) sub-part and so on. One data source may override another data source's data, e.g., the representative image that is usually used on a television show's rendered tile may be temporarily overridden to use a different image this week, and so on. Step 504 represents composing the data item from the data source or sources, including retrieving and combining any sub-parts as needed to form the data item's data.

Step 506 evaluates whether the data source(s) indicates that the data item is to expire before the default expiration time (e.g., of six hours from the request time; in one or more implementations, the request time is part of the request, but if not present, the actual current time may be used, as requests should be processed relatively quickly). If so, the source-specified time window expiration time is used (step 508), otherwise the default time (e.g., of six hours later) is used (step 510). Basically steps 506, 508 and 510 choose the earlier of the source-specified time window expiration time or the default expiration time (e.g., time of request plus six hours) as the expiration time of the data item.

Step 512 returns the data item's data including the expiration time to the requestor. The cache framework also receives the data item (e.g., its data including timestamp), and writes it through to the cache or tiered caches at its level. As described herein including with reference to FIG. 6, if a cache is wrapped with the cache decorator pattern, the data is written into both the current and future data subsets of the [key, value set] pair.

Figure 6:
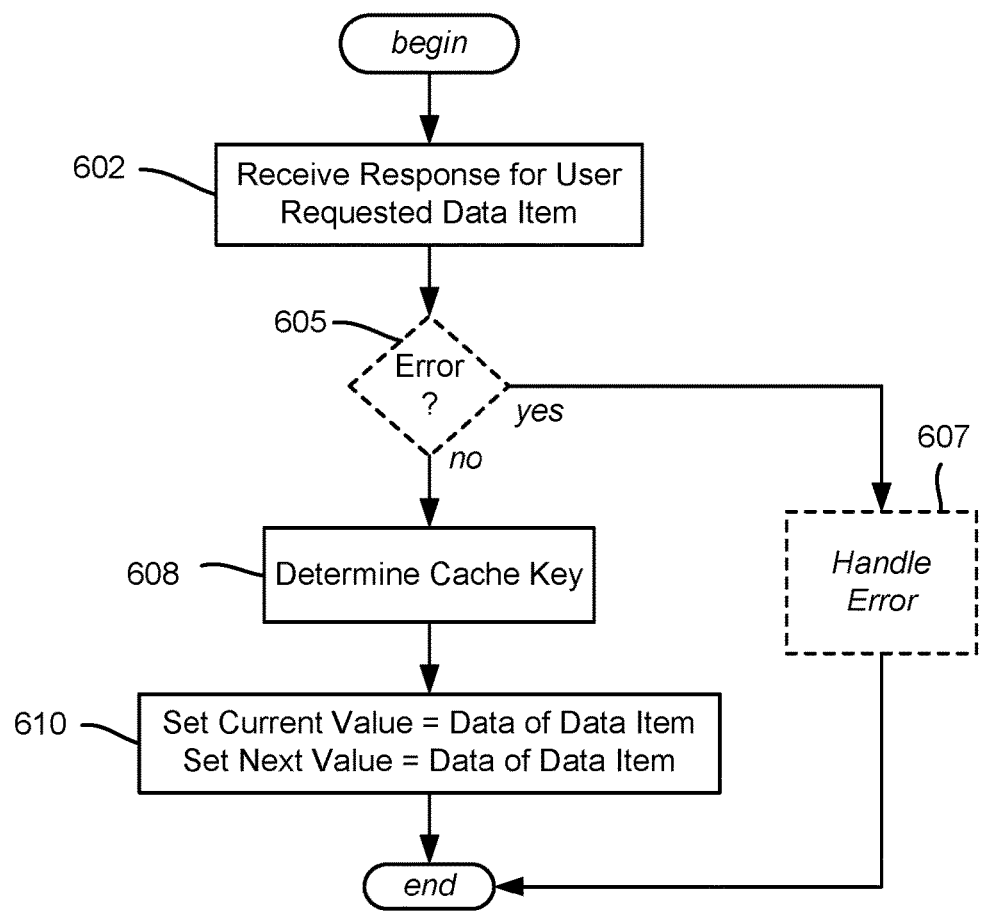
FIG. 6 is a flow diagram showing example logic/steps that may be taken when receiving a response for a data request, with data from the response written through to a cache having current and next value subsets of a value set, according to one or more example implementations.

FIG. 6 shows example steps that are performed by the cache framework and cache decorator pattern on a cache write-through operation for a cache having current and next data value subsets and expiration times. Step 602 represents receiving the response; (an error response is not cached, and need not reach the cache framework, however steps 605 and 607 are shown for purposes of completeness to reiterate that a possible valid response to a request may be an error).

Step 608 determines the cache key for the data item, e.g., the hash computation as part of a "Set" request from the cache framework; (note that batch caching may be available, however a single "Set" operation is described herein). Step 610 is performed by the cache decorator pattern, which sets both the current value subset of the data item and the next value subset of the data item, including the current and next timestamps, as the same data as received in the response at step 602. Note that this keeps the cache decorator pattern straightforward, as the cache decorator pattern does not deal with making requests for future data or the like when writing information to the cache. Instead, the cache refresher logic makes requests for future data when appropriate.

Figure 7:
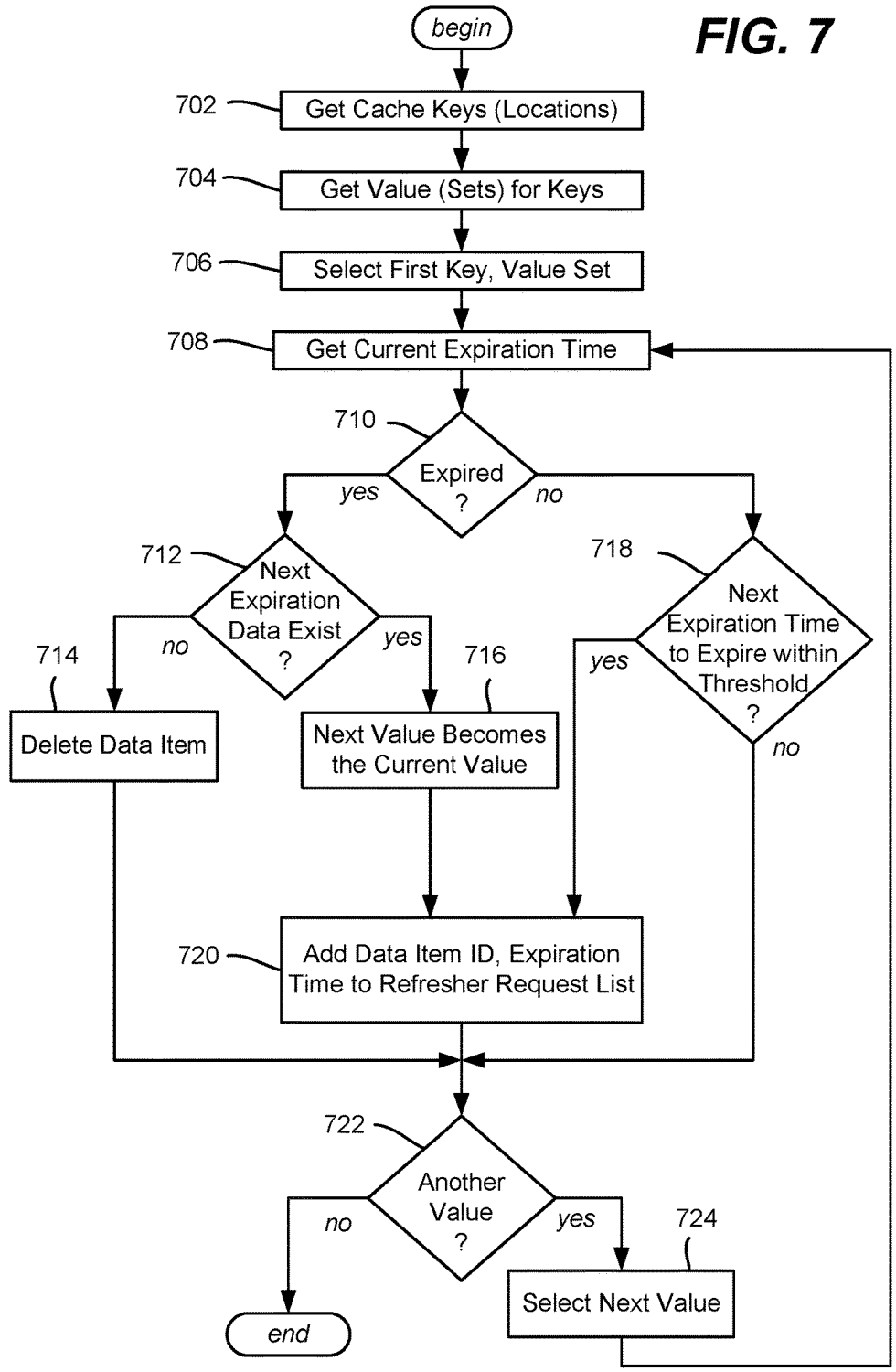
FIG. 7 is a flow diagram showing example logic/steps that may be taken as part of (e.g., periodically) refreshing a cache, including for adding future data, according to one or more example implementations.

FIG. 7 shows example operations of one suitable cache refresher when run, e.g., periodically. Step 702 represents the refresher obtaining the cache keys corresponding to cache locations that contain data items. Step 704 represents obtaining the values for each of these keys. Note that for a REDIS cache, steps 702 and 704 may be performed by REDIS cache operations; if too much data is cached to get all values at once, step 704 may be performed in partial requests. For other types of hash-mapped caches, one alternative is to track which locations have data. Note that this is for efficiency, as it is alternatively feasible for the refresher to go through each cache location and move to the next location if no data is cached at that location and so on, rather than only process the subset of the cache corresponding to locations with data items cached. In any event, step 706 selects the first key, value set which in this implementation is of a cache location that has cached data.

Step 708 gets the current expiration time from the current data subset of the [key, value set]. Step 710 evaluates the expiration time of the current value subset; if not expired, step 710 branches to step 718, described below. If expired, then step 712 checks for whether a next expiration value subset/next expiration time exists. If not, then this may be the situation when the data item is outside of its offering time window, (e.g., as the request for the item received an HTTP 404 not-found response), and thus step 714 deletes the data item from the cache. Note that it is feasible for a different error to have occurred with respect to attempting to obtain the next value subset, e.g., communication with the data source(s) failed. Typically such errors are not written to the cache and thus the next data subset still exists (even if also expired), but if another such error is written to the cache over the next value subset, step 712 may be configured to recognize this situation and consider this type of error as one does not necessarily delete the cache entry but instead attempts to obtain a new next cache entry, e.g., via step 720.

If the current value subset is expired and the next expiration value subset/next expiration time exists at step 712, a refresh of this data item is performed. Step 716 changes the current value subset including the current expiration time to (what was) the next value subset including the next expiration time. Step 720 then requests a new next value subset with a new next expiration time, e.g., by adding the data item ID and the expiration time to a request list, as described below, although it is alternatively feasible to request the data item more directly.

Returning to step 710, if the current value is not expired, step 718 evaluates for whether the next expiration time will expire within a threshold time limit, e.g., such as on the order of a minute or two from the present time. If not, then no update of the next value subset is needed, as the current value subset data (step 710) and the next value subset data (step 718) are to remain as is, for now. Steps 722 and 724 thus move on and repeat the process for the next key, until each [key, value] set obtained at steps 702 and 704 has been processed.

When a refresh of the next subset value is needed, step 720 requests a new next value subset with a new next expiration time, e.g., by adding the data item ID and the expiration time to a request list, as described herein, although it is alternatively feasible to request the data item more directly. Note that the current value subset thus remains in use until expired.

It should be noted that in FIG. 7, if both the current value and the next value are expired, then at step 716 the current value is replaced with the next value, which is also expired. This is not problematic because 720 (and FIG. 8, described below) obtains a new next value (or possibly an outside-of-time-window error), whereby the decorator pattern will operate as described above with reference to FIG. 4. In general, only if the refresher is not run often enough can a large number of cache misses occur, causing requests to reach the next level.

Figure 8:
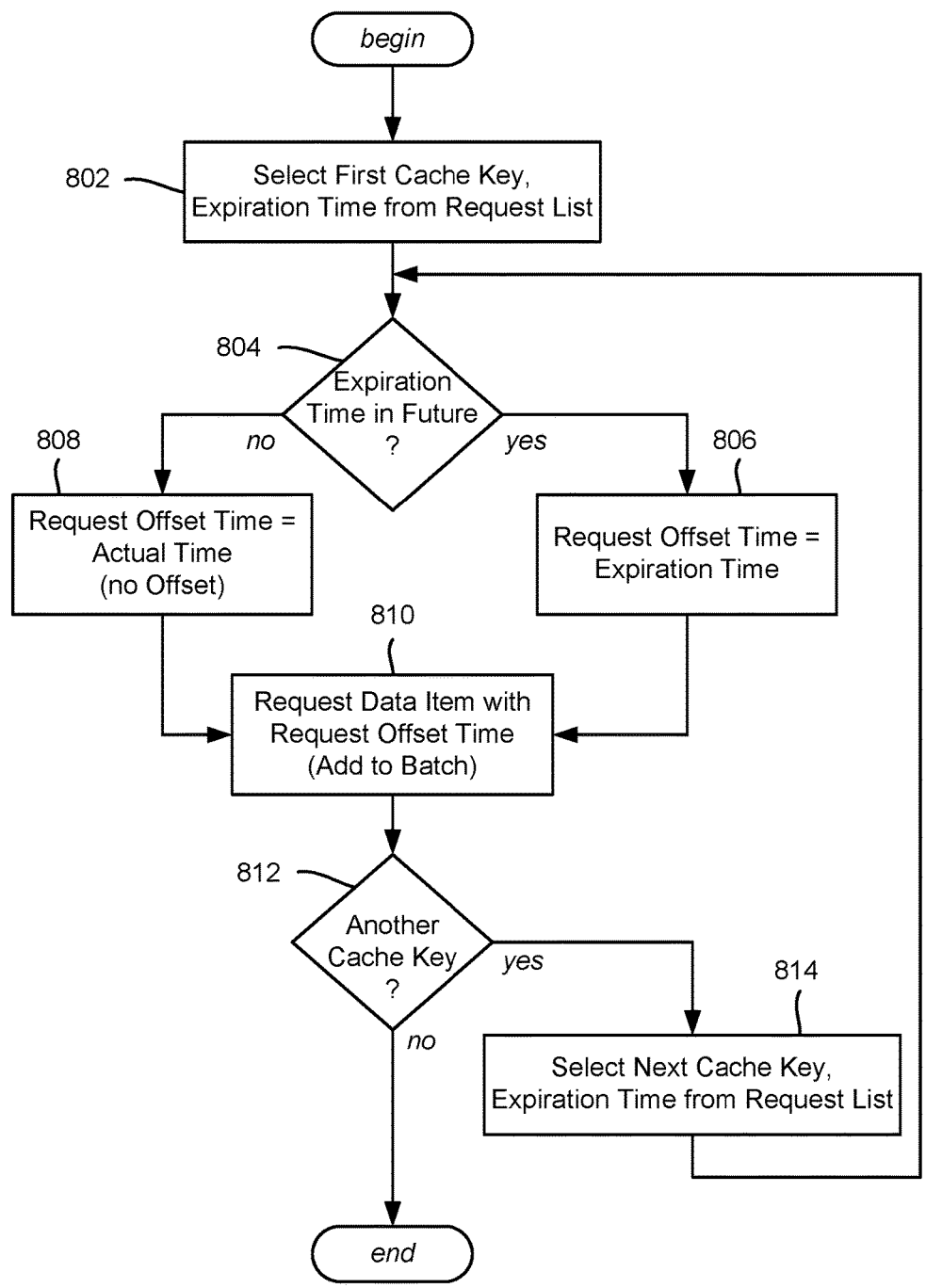
FIG. 8 is a flow diagram showing example logic/steps that may be taken as part of obtaining future data for refreshing a cache, according to one or more example implementations

FIG. 8 shows example operations to obtain future data for the cache, e.g., based upon the list built via step 720 of FIG. 7. Note that such a list may be processed as soon as a cache key is added to the list, rather than waiting for the entire list to be built before making requests. Moreover, depending on the cache features or the like, such a list may have some (or all) of its cache keys batched in one or more batch request, for efficiency. Thus, as is understood, the example steps of FIG. 8 may be performed (e.g., triggered) any time that there is at least one cache key for which future data is being sought, which may be in parallel with some or all of the steps of FIG. 7, or in a single-threaded environment, by performing the steps of FIGS. 7 and 8 as asynchronous sub-tasks that are interleaved in any suitable manner.

Step 802 of FIG. 8 represents selecting the first cache key, along with its associated expiration time, from the list. Step 804 double-checks that the associated expiration time is in the future, which may not be the situation if the refresher is not running often enough. If the expiration time is in the future, the future data is requested via an offset, as if the current time was that future expiration time, via steps 806 and 810. Note that the data source(s) contain such future data, (as long as the data item is within its expiration time window) and are equipped to handle such time-offset requests. Otherwise, the current actual time, that is, with zero as the time offset, is used via steps 808 and 810.

Step 810 represents making the request, which may include adding the request to a batch request data structure or the like. For example, a batch request data structure may be used to send a batch request (e.g., periodically per timeframe), which in general is more efficient than sending individual data item requests. Note that if the data structure is limited in the number of requests, e.g., to sixteen or thirty-two requests per batch, multiple batch requests can be sent per timeframe.

Steps 812 and 814 repeat the process for other keys on the list, until none remain. As set forth above, the example steps of FIG. 8 may be re-run any time a new key is added to the list by the cache refresher (step 720 of FIG. 7), or may be triggered on some other basis, e.g., when the list of keys reaches a limit (such as every ten keys) and/or at the completion of the cache refresher (e.g., the "no" branch of FIG. 7, step 722).

Figure 9:
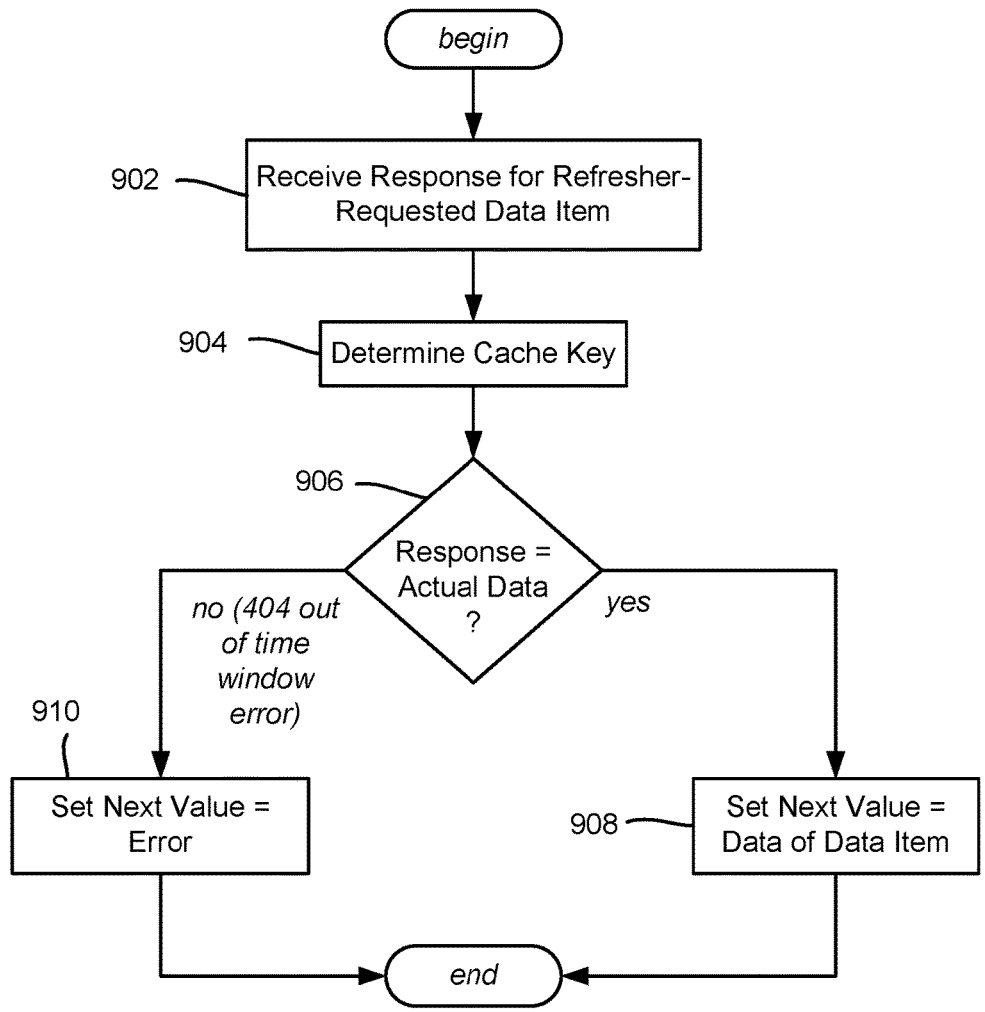
FIG. 9 is a flow diagram showing example logic/steps that may be taken as part of writing a cache based upon a response to a request for future data, according to one or more example implementations

FIG. 9 represents handling a response received for a refresher-requested future data item from the backing data source(s), e.g., at a "Set" portion of the cache refresher (or possibly a decorator pattern configured to set future data as such); in any event, the recipient knows how to deal with such future data by writing it to the future (next) value subset of the value set. Note that the future data may actually be zero time offset (e.g., via step 808 of FIG. 8). Further note that batch responses containing multiple future data items may be received, however for purposes of explanation FIG. 8 exemplifies a single response being received.

Step 902 receives the future data in response to the refresher's request for the future data, e.g., made via the example steps of FIG. 8. Step 904 computes the key from the data item identifier.

Step 906 determines whether the response contains actual data or an error message indicative of a request for a data item with an expiration outside the time window, e.g., an HTTP 404 Not Found Error. If actual data, step 908 writes the data to the cache as new, next data. Note that the data need not be moved within the cache entry's value set, but rather pointers may be swapped, e.g., the current pointer may be changed to point to the "formerly" next data subset, and what was the current data subset overwritten with the new next data and pointed to by the next pointer. As used herein, the term "replace" or "replacement" or the like refers to changing one value subset to another, whether by manipulating pointers, by moving data, by overwriting data, and so forth.

If the error is a not found (e.g., time window expiration) error, step 910 sets the future value as an error so as to be recognized by the cache refresher as such (at step 712 of FIG. 7) to set this cache entry for deletion. Note that the type of error generally matters, e.g., an HTTP 404 Not Found Error indicates that the request for future data was received but there is no such future data, whereas another error type (e.g., a time out error because communication with the data source was down) does not indicate the requested data item is no longer available at the requested time. Thus, the error type can be written into the future value subset in the cache, or something else may be done to indicate the cache entry is to be deleted, such as leaving the future value subset intact for other types of errors, (and writing NULL or the like to the future value delete time window expiration errors). Note that the entry is not deleted at step 910, because the current expiration time may not have been met yet.

As can be readily appreciated, the threshold time (used at step 718 of FIG. 7), which is configurable, needs be chosen so as to provide sufficient time for a data item to be requested and cached. For example, consider that the threshold time is five minutes, and data item A has a current value subset with expiration time of 5:00 pm and a future value subset with expiration time of 8:00 pm, (because initially both subsets are the same as described herein). When the refresher runs after 4:55 pm, step 718 determines that the next expiration time is within the threshold expiration time, and thus requests a new next value, with a time offset as if the actual time was 5:00 pm. The current value, which is not expired, is left intact; (note however that an alternative is to have the former next expiration time of 5:00 pm, which is the same as the current expiration time, become the current expiration time, as can the former next data, because initially the next value subset is the same as the current value subset), whereby the cache decorator pattern will continue to return that same data up until 5:00 pm, which is the intended objective. As long as the new next data, e.g., with an expiration time of 11:00 pm is written to the cache as the next data value subset before the current time expires, the technology precludes a flood of client requests for that data item from reaching the next level, as only a single request from the cache refresher is needed to populate the cache in advance for that data item.

In one or more implementations, both the front-end cache refresher and back-end cache refresher make time-offset data requests that reach the back-end data source(s), because time-offset requests bypass the cache(s). However, it is feasible to have an implementation in which the back-end servers are configured to recognize requests for future data received from the front-end, and access any back-end cache wrapped with a cache decorator pattern to look for future data that satisfies the front-end request. In such an implementation, the threshold times may be set differently, so that, for example, the back-end data service gets future data into its cache before the front-end service requests the future data, whereby the front-end service's request for future data is obtainable from a back-end cache rather than needing to send the request down to the data source(s).

It should be noted that the technology described herein is not limited to dual cache value subsets for an entry, e.g., for current and future data. Instead, for example, any practical number of cache value subsets may be used. For example, a cache refresher or the like may be run less frequently if more than two cache value subsets are used. Moreover, the cache decorator pattern may be configured to use one or more criteria other than (or in conjunction with) expiration time to decide among cache value sets; for example, a "special"

value set may be cached and used based upon any criterion or criteria, e.g., select the fourth value subset on a particular holiday so as to offer more content to client users than on other days.

As can be seen, there is provided a technology for maintaining multiple subsets of values for cached data items, including a future value subset that is used once a current value subset expires. The technology refreshes a cached data item with a future data item value subset in advance of its expiration, based upon reaching a configurable threshold time, so that client requests for that data item may be satisfied by data from the cache even as the current cached data item value subset expires.

One or more aspects are directed towards maintaining a cache that has data item data therein, including, for at least some data items, a current value subset and a next value subset corresponding to each data item. Upon receiving a request for data item, the cache is accessed for the data item. Described is returning a cache miss if the data item is not in the cache, returning data corresponding to a current value subset of the data item in response to the request if the current value subset is not expired, returning data corresponding to a next value subset of the data item in response to the request if the current value subset is expired and the next value subset is not expired, or returning a cache miss or expired data if the current value subset is expired and the next value subset is expired.

Aspects may include refreshing data items in the cache, including by determining whether a data item has its current value subset expired, and if so, replacing the current value subset with the next value subset and requesting a new next value subset. Requesting the new next value subset may include requesting a future value of the data item with at a time that is offset based upon an expiration time of the next value subset.

Aspects may include refreshing data items in the cache, including determining that a data item has its current value subset expired and replacing the current value subset with the next value subset, requesting a new next value subset, and receiving a response to the new next value subset request, If the response includes new next value subset data, described herein is writing the new next value subset data into the cache as the next value subset, and if the response indicates that the requested future data is outside of its time window, setting up the cache entry for deletion.

Described herein is refreshing data items in the cache, including determining whether a data item has its current value subset expired, and if so, determining whether a next value subset is present. If not present, the data item may be deleted from the cache, or if present, the current value subset may be replaced with the next value subset and a new next value subset requested. A response to the new next value subset request may be received, and if the response includes new next value subset data, the new next value subset data may be written into the cache as the next value subset. If instead the response indicates that the requested future data is outside of its time window, described herein is setting up the cache entry for deletion, e.g., so that the next run of the cache refresher logic recognizes the cache entry is to be deleted and thus deletes it.

Refreshing data items in the cache may include determining whether a data item has its current value subset expired. If not, described herein is determining whether the future value subset of the data item is to expire within a threshold time, and if so, changing the current value subset to be the next value subset and requesting a new next value subset. A response to the new next value subset request may be received, and if the response includes new next value subset data, the new next value subset data may be written into the cache as the next value subset; if the response indicates that the requested future data is outside of its time window, the cache entry may be set up for deletion.

One or more aspects are directed towards a cache configured to maintain data items in cache locations, in which an identifier of a data item corresponds to a cache location key, and the cache data at that location comprises a value set. Cache access logic is configured to handle the value set in the cache location as multiple data value subsets. Cache refresher logic determines whether a subset of data in a cache location is expired, and when expired, replaces the subset of data that is expired with a replacement subset, and obtains a new replacement subset for caching in the cache location.

The cache access logic may handle a cache read request directed to a single value set as a read request directed to one of the multiple data value subsets. The cache access logic may handle a cache write request directed to a single value set as a write request to each of the multiple data value subsets.

There may be a server including at least one process that handles user requests, in which the server is coupled to the cache via the cache access logic; the refresher may be a separate process relative to the server.

The cache access logic may comprise a cache decorator pattern. A cache framework may access the cache to look for data based upon read requests from a requestor, and may access the cache to write data based upon data returned from a data-providing entity, in which the cache framework accesses the cache via the cache decorator pattern.

The cache refresher logic may determine when one subset of data in the cache location is not expired and another subset of data in the cache location is going to expire within a threshold time. The cache refresher logic may replace the one subset of data that is not expired with the subset of data that is going to expire within the threshold time, and obtain a new subset of data to replace the subset of data that is going to expire within the threshold time.

The single value set in the cache location may comprise two cache value subsets, including a current value subset and a next value subset. The single value set in the cache location may include a current cache value subset, in which the cache refresher logic is configured to delete the data item from the cache location when the current subset of data in the cache location is expired, and no replacement subset is in the single value set.

One or more aspects are directed towards maintaining a cache of data items, in which at least some of the cached data items include a current value subset and a next value subset, and refreshing the cache, including determining whether a data item has its current value subset expired. If the data item has its current value subset expired, described herein is determining whether the data item has a next value subset; if so, the current value subset is replaced with the next value subset and a new next value subset requested; if not, the data item is deleted from the cache. If the data item does not have its current value subset expired, described herein is determining whether a next value subset of the data item is to expire within a threshold time, and if so, replacing the current value subset with the next value subset and requesting a new next value subset.

Upon receiving the new next value subset, the technology may replace the next value subset with the new next value subset.

Other aspects may include receiving a request for a data item, accessing the cache for the data item, and: returning a cache miss if the data item is not in the cache, returning data corresponding to the current value subset of the data item in response to the request if the current value subset is not expired, returning data corresponding to the next value subset of the data item in response to the request if the current value subset is expired and the next value subset is not expired, or returning a cache miss or expired data if the current value subset is expired and the next value subset is expired.

Upon receiving a data item for writing to the cache, a cache location may be determined based upon an identifier of the data item. Data of the data item including an expiration time may be written to the cache location as a value set, which may include writing a current value subset having the data of the data item including the expiration value as a current expiration time, and writing a next value subset having the data of the data item including the expiration value as a next expiration time.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 10 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 10:
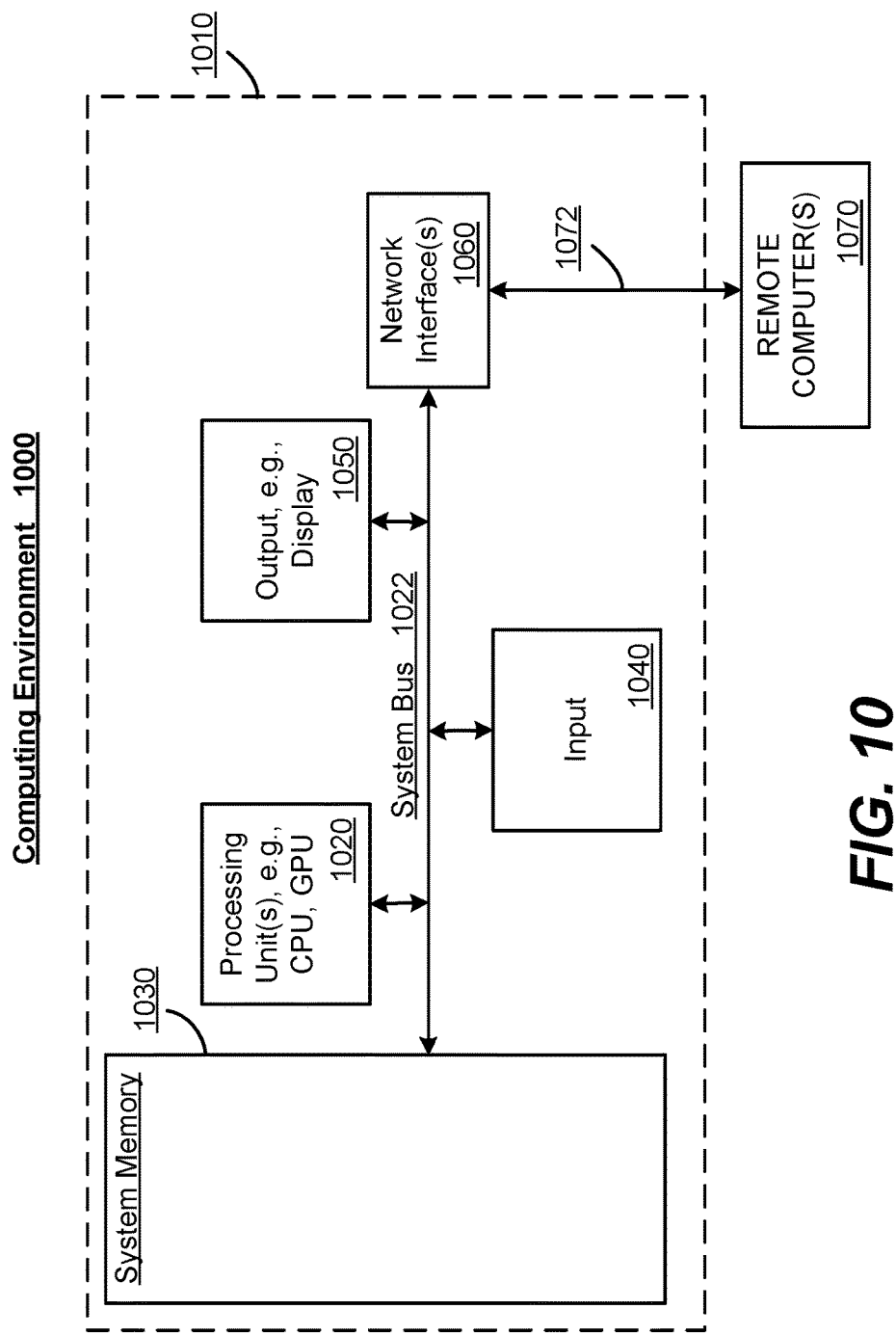
FIG. 10 is a block diagram representing an example computing environment into which aspects of the subject matter described herein may be incorporated.

FIG. 10 thus illustrates an example of a suitable computing system environment 1000 in which one or aspects of the implementations described herein can be implemented, although as made clear above, the computing system environment 1000 is only one example of a suitable computing environment and is not intended to suggest any limitation as to scope of use or functionality. In addition, the computing system environment 1000 is not intended to be interpreted as having any dependency relating to any one or combination of components illustrated in the example computing system environment 1000.

With reference to FIG. 10, an example device for implementing one or more implementations includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of machine (e.g., computer) readable media and can be any available media that can be accessed by a machine such as the computer 1010. The system memory 1030 may include computer storage media in the form of volatile and/or nonvolatile memory such as read only memory (ROM) and/or random access memory (RAM), and hard drive media, optical storage media, flash media, and so forth. By way of example, and not limitation, system memory 1030 may also include an operating system, application programs, other program modules, and program data.

A user can enter commands and information into the computer 1010 through one or more input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system"

and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:
    maintaining, by a device comprising a processor and operating as a front end to a back-end service that is coupled to one or more backing data sources, a cache that has data items therein, including, for at least some of the data items, a current value subset and a next value subset corresponding to each data item;
    receiving, by the device, a request for a data item;
    accessing the cache for the data item, comprising:
        in response to the data item not being in the cache, returning a cache miss if the data item is not in the cache, and
        in response to the data item being in the cache:
            returning data corresponding to a current value subset of the data item in response to the request if the current value subset is not expired,
            returning data corresponding to a next value subset of the data item in response to the request if the current value subset is expired and the next value subset is not expired, or
            returning a cache miss or expired data if the current value subset is expired and the next value subset is expired; and
    refreshing, by the device, data items in the cache, including in response to determining that a data item has its current value subset expired, replacing the current value subset with the next value subset by changing the current pointer to point to the next data subset and requesting a new next value subset from a back-end cache of the back-end service and overwriting the current data subset with the new next value and pointed to by the next pointer, wherein the requesting the new next value subset comprises generating a request for a future value of the data item, where the request employs a time-offset parameter comprising a future expiration time of the next value subset that is later than a current time of the request, wherein the future value of the data item corresponds to the future expiration time, wherein the future expiration time indicates that the requested data item is no longer available at the requested time.

2. The method of claim 1, wherein the refreshing the data items in the cache further comprises:
    receiving a response to the request,
    in response to determining that the response includes new next value subset data, writing the new next value subset data into the cache as the next value subset, and
    in response to determining that the response indicates that the requested future data is outside of a time window, setting up a cache entry associated with the data item for deletion.

3. The method of claim 1, wherein the replacing the current value subset with the next value subset comprises:
    in response to determining that the next value subset is not present, deleting the data item from the cache, and foregoing the request, or
    in response to determining that the next value subset is present, replacing the current value subset with the next value subset.

4. The method of claim 3, further comprising:
receiving a response to the request,
in response to determining that the response includes new next value subset data, writing the new next value subset data into the cache as the next value subset, and
in response to determining that the response indicates that the requested future data is outside of a time window, setting up a cache entry associated with the data item for deletion.

5. The method of claim 1, wherein the refreshing the data items in the cache further comprises in response to determining that the data item does not have its current value subset expired, performing the requesting the new next value subset in response to determining that the next value subset of the data item is going to expire within a threshold time prior to the future expiration time of the next value subset.

6. The method of claim 5, further comprising:
receiving a response to the request,
in response to determining that the response includes new next value subset data, writing the new next value subset data into the cache as the next value subset, and
in response to determining that the response indicates that the requested future data is outside of a time window, setting up a cache entry associated with the data item for deletion.

7. A system operating as a front end to a back-end service that is coupled to one or more backing data sources comprising:
a cache configured to maintain data items therein, including, for at least some of the data items, a current value subset and a next value subset corresponding to each data item;
cache access logic configured to:
receive a request for a data item;
access the cache for the data item, comprising:
in response to the data item not being in the cache, return a cache miss if the data item is not in the cache, and
in response to the data item being in the cache:
return data corresponding to a current value subset of the data item in response to the request if the current value subset is not expired,
return data corresponding to a next value subset of the data item in response to the request if the current value subset is expired and the next value subset is not expired, or
return a cache miss or expired data if the current value subset is expired and the next value subset is expired; and
cache refresher logic configured to refresh data items in the cache, including in response to a determination that a data item has its current value subset expired, replace the current value subset with the next value subset by changing the current pointer to point to the next data subset and request a new next value subset from a back-end cache of the back-end service and overwriting the current data subset with the new next value and pointed to by the next pointer, wherein the request of the new next value subset comprises generation of a request for a future value of the data item, where the request employs a time-offset parameter comprising a future expiration time of the next value subset that is later than a current time of the request, wherein the future value of the data item corresponds to the future expiration time, wherein the future expiration time indicates that the requested data item is no longer available at the requested time.

8. The system of claim 7, wherein the refresh of the data items in the cache further comprises:
receipt of a response to the request,
in response to a determination that the response includes new next value subset data, write the new next value subset data into the cache as the next value subset, and
in response to a determination that the response indicates that the requested future data is outside of a time window, set up a cache entry associated with the data item for deletion.

9. The system of claim 7, wherein the replacement of the current value subset with the next value subset comprises:
in response to a determination that the next value subset is not present, delete the data item from the cache, and foregoing the request, or
in response to a determination that the next value subset is present, replace the current value subset with the next value subset.

10. The system of claim 9, wherein the refresh of the data items in the cache further comprises:
receipt of a response to the request,
in response to a determination that the response includes new next value subset data, write the new next value subset data into the cache as the next value subset, and
in response to a determination that the response indicates that the requested future data is outside of a time window, set up a cache entry associated with the data item for deletion.

11. The system of claim 7, wherein the refresh of the data items in the cache further comprises in response to a determination that the data item does not have its current value subset expired, perform the requesting the new next value subset in response to determining that the next value subset of the data item is going to expire within a threshold time prior to the future expiration time of the next value subset.

12. The system of claim 11, further comprising:
receipt of a response to the request,
in response to a determination that the response includes new next value subset data, write the new next value subset data into the cache as the next value subset, and
in response to a determination that the response indicates that the requested future data is outside of a time window, set up a cache entry associated with the data item for deletion.

13. A non-transitory computer-readable medium having instructions stored thereon that, in response to execution, cause a system including a processor and operating as a front end to a back-end service that is coupled to one or more backing data sources to perform operations, comprising:
maintaining a cache that has data items therein, including, for at least some of the data items, a current value subset and a next value subset corresponding to each data item;
receiving a request for a data item;
accessing the cache for the data item, comprising:
in response to the data item not being in the cache, returning a cache miss if the data item is not in the cache, and
in response to the data item being in the cache:
returning data corresponding to a current value subset of the data item in response to the request if the current value subset is not expired, returning data corresponding to a next value subset of the data item in response to the request if the current value subset is expired and the next value subset is not expired, or returning a cache miss or expired data if the current value subset is expired and the next value subset is expired; and refreshing, by the device, data items in the cache, including in response to determining that a data item has its current value subset expired, replacing the current value subset with the next value subset by changing the current pointer to point to the next data subset and requesting a new next value subset from a back-end cache of the back-end service and overwriting the current data subset with the new next value and pointed to by the next pointer, wherein the requesting the new next value subset comprises generating a request for a future value of the data item, where the request employs a time-offset parameter comprising a future expiration time of the next value subset that is later than a current time of the request, wherein the future value of the data item corresponds to the future expiration time, wherein the future expiration time indicates that the requested data item is no longer available at the requested time.

14. The non-transitory computer-readable medium of claim 13, wherein the refreshing the data items in the cache further comprises:

receiving a response to the request, in response to determining that the response includes new next value subset data, writing the new next value subset data into the cache as the next value subset, and in response to determining that the response indicates that the requested future data is outside of a time window, setting up a cache entry associated with the data item for deletion.

15. The non-transitory computer-readable medium of claim 13, wherein the replacing the current value subset with the next value subset comprises:

in response to determining that the next value subset is not present, deleting the data item from the cache, and foregoing the request, or in response to determining that the next value subset is present, replacing the current value subset with the next value subset.

16. The non-transitory computer-readable medium of claim 15, further comprising:

receiving a response to the request, in response to determining that the response includes new next value subset data, writing the new next value subset data into the cache as the next value subset, and in response to determining that the response indicates that the requested future data is outside of a time window, setting up a cache entry associated with the data item for deletion.

17. The non-transitory computer-readable medium of claim 13, wherein the refreshing the data items in the cache further comprises in response to determining that the data item does not have its current value subset expired, performing the requesting the new next value subset in response to determining that the next value subset of the data item is going to expire within a threshold time prior to the future expiration time of the next value subset.

18. The non-transitory computer-readable medium of claim 17, further comprising:

receiving a response to the request, in response to determining that the response includes new next value subset data, writing the new next value subset data into the cache as the next value subset, and in response to determining that the response indicates that the requested future data is outside of a time window, setting up a cache entry associated with the data item for deletion.

* * * * *